United States Patent [19]
Bookless et al.

[11] 3,836,250
[45] Sept. 17, 1974

[54] MICROFILM CAMERA APPARATUS

[75] Inventors: George W. Bookless, Franklin Park; Heinz E. Hertel, Mount Prospect; Robert L. Kearney, Northbrook, all of Ill.

[73] Assignee: Bell & Howell Company, Chicago, Ill.

[22] Filed: Apr. 9, 1973

[21] Appl. No.: 349,365

[52] U.S. Cl.................... 355/65, 352/178, 354/171, 354/213, 354/275, 355/70
[51] Int. Cl.... G03b 1/12, G03b 19/04, G03b 27/46
[58] Field of Search .................: 355/24, 65, 66, 70; 352/178; 95/31 FM; 354/171, 213, 275

[56] References Cited
UNITED STATES PATENTS

| | | | |
|---|---|---|---|
| 2,984,150 | 5/1961 | Osgood, Jr. | 355/24 |
| 3,124,996 | 3/1964 | Pfaff | 355/65 |
| 3,342,100 | 9/1967 | Maloney et al. | 355/24 |
| 3,539,257 | 11/1970 | Hoyne et al. | 355/65 |

*Primary Examiner*—Richard A. Wintercorn
*Attorney, Agent, or Firm*—Robert A. Walsh; Gerald B. Epstein

[57] ABSTRACT

A microfilm camera apparatus for recording a projected image on a film disposed in a cartridge adapted to be inserted in the apparatus. The camera includes means for driving the film past an exposure window in the cartridge. The cartridge comprises a measuring capstan which includes a cam drive means for operating a control which arrests movement of the film after the film has advanced a predetermined increment. The lens system of the apparatus includes an aperture block adapted for insertion through a window in the cartridge for holding the film firmly against an exposure station during exposure. A switch trip mechanism responsive to the end of the reel of film in the cartridge generates a signal which alerts the operator that a new film cartridge should be inserted. In addition, the apparatus includes a novel over-center cartridge latch device for holding the film cartridge firmly in place in the apparatus until manually released. Also, a novel arrangement of spring-biased drive gears are provided in the housing to engage a mating gear attached to a film advance mechanism in the cartridge.

44 Claims, 8 Drawing Figures

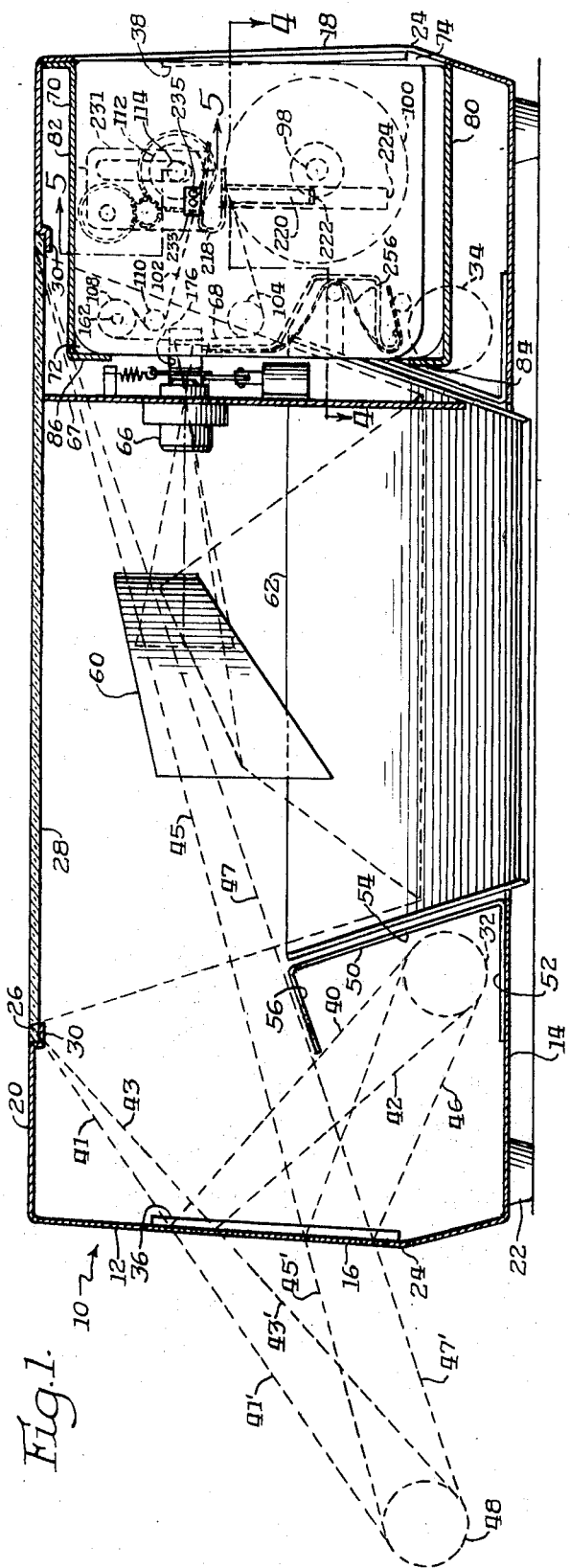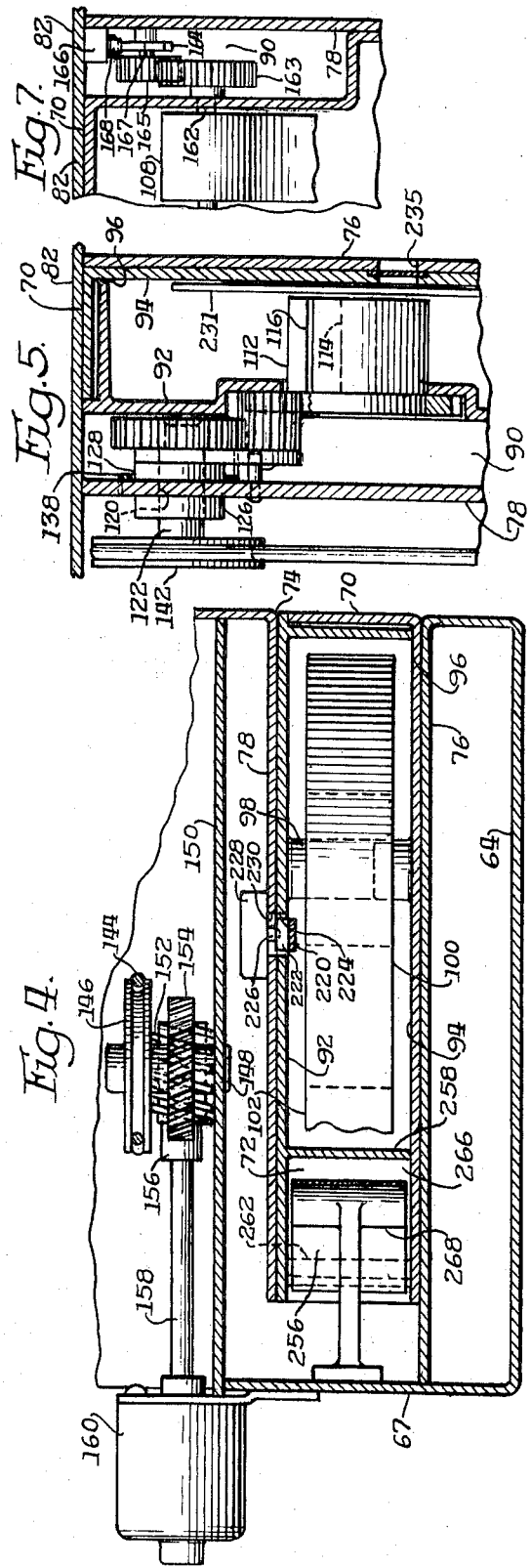

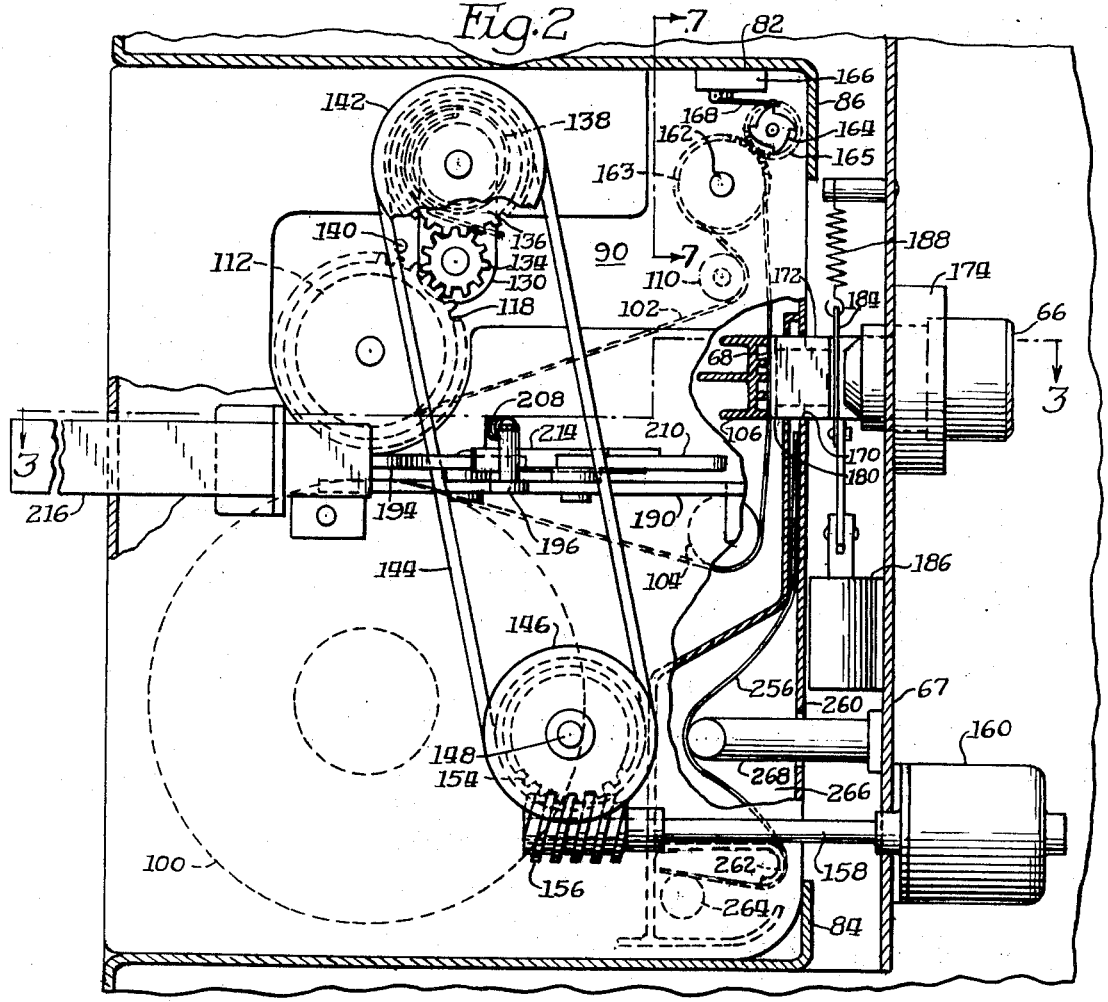

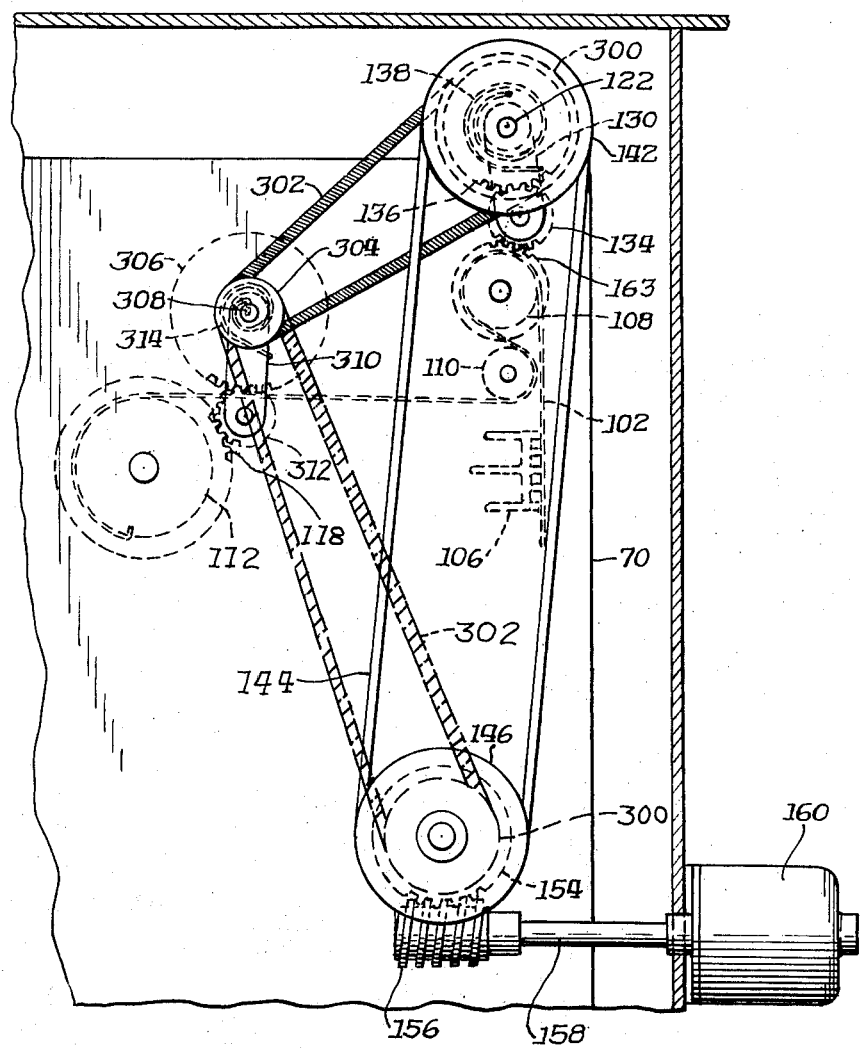

MICROFILM CAMERA APPARATUS

The present invention relates to a microfilm apparatus, and in particular to a microfilm camera for projecting an image on film disposed in a cartridge.

Microfilm cameras are being extensively used by small as well as large organizations to photographically record important and valuable documents in miniature size on a reel of film, known throughout the trade as microfilm. This enables the disposal of large volumes of files, while still permitting the retention of the information contained in these files. The reels of film may be kept in a considerably smaller space than is necessary to store massive amounts of documents in their original form.

Present microfilm cameras are large, cumbersome, and expensive, often requiring specially trained personnel to operate and use the equipment. In addition, large cameras require the allocation of additional amounts of office space which can best be put to other uses. As a result, many small organizations with comparable physical facilities and a minimal volume of microfilming work cannot afford the time, expense, manpower, and space allocation necessary to efficiently utilize present microfilming systems. At present, many of these small organizations are sending their work to be microfilmed to outside contractors, or are having these contractors come into their plant with elaborate equipment for microfilming once a sufficient amount of documents has been accumulated.

The present invention has a primary object the provision of a compact, easy to operate, inexpensive microfilm recording camera which will fill the needs of those organizations with minimal, but necessary, document recording requirements. The camera embodying the present invention is so designed and constructed that it can be operated by ordinary office personnel without specialized training, and its compact size enables it to be located and used on one corner of a standard office desk. The camera is adapted to record images on a reel of film supplied in a pre-loaded cartridge casing that does not require operator threading, which casing can readily be inserted in or removed from a chamber provided in the apparatus. The camera housing comprises a film drive mechanism which cooperates with a mating drive element on the cartridge for moving the film in selected increments past an exposure window in the cartridge. Each increment of movement is equal to one frame of film exposure. The cartridge also includes a measuring device which coacts with the control for the film drive mechanism in the housing for insuring that the film in the cartridge is moved a predetermined incremental distance following each exposure.

In prior microfilm recording instruments which use cartridge-supplied film, both the camera and cartridge must be removed from the instrument when it is desired to record documents at a different station, or to use equipment having a different reduction ratio. In the apparatus embodying the present invention, however, the camera, including the projection and lens systems, remains in place, while only the cartridge needs to be moved for use in a different camera.

Also, in prior microfilm cameras, a door was provided which had to be opened to remove the film cartridge, thereby breaking the light seal surrounding the image projection system. In the present device, a chamber for insertion of the cartridge is located outside the boundaries of the light seal, allowing the cartridge to be inserted and removed without leaking light into the projector system, and without distrubing the gearing and belt arrangement employed to drive the film in the cartridge.

The camera embodying the concepts of the present invention also includes a lens system for projecting an image onto a segment of the film, including means extending into the cartridge for firmly, but releasably, holding the film in a flat position against an exposure station during exposure. Additionally, a novel cartridge latch and release mechanism is provided for holding the cartridge in its proper location in the camera during exposure of the film, and for readily releasing the cartridge from the camera when desired.

Other features of the novel camera disclosed herein include means coacting between the cartridge and camera for generating a perceptible signal when the unexposed film in the cartridge has been substantially depleted, and means for insuring positive engagement between the drive element on each cartridge and the drive mechanism disposed in the camera housing.

Therefore, an additional object of the present invention is to provide a cartridge-supplied microfilm camera wherein cartridges of film may be inserted and removed from the camera at will and each cartridge's film drive element properly mates with the film drive mechanism in the camera housing.

One of the additional objects of the proposed invention is to provide a microfilm camera adapted to accept pre-loaded film cartridges wherein each cartridge retains its own film footage indicator or meter. In many existing cameras, when the cartridge is removed, identification as to the amount of film used by the cartridge is generally lost. Most existing devices include the film footage meter as part of the camera device or housing which requires the operator to read the film footage indicator on the camera and place a mark on the cartridge prior to removal indicating how much film has been used. In the present system, however, the footage indicator is integral with the cartridge; therefore, the identification as to film footage used on that cartridge is retained when the cartridge is removed.

Still another object of the present invention is to provide a microfilm camera having means associated with a cartridge and a film drive mechanism for said cartridge adapted to insure that the film is moved a predetermined incremental amount following each exposure.

A further object of the present invention is the provision of means associated with the lens system of the camera for maintaining segments of film in a firm, flat position against an exposure station during exposure.

An additional object of the present invention is to provide in a cartridge-supplied microfilm camera a unique cartridge latch and release mechanism for properly locating and holding the film cartridge in the camera.

Still a further object of the present invention is to provide a cartridge-supplied microfilm camera having means coacting between the camera and film cartridge for detecting the approximate end of the reel of film.

While it has been stated that the primary purpose of this invention is to provide a compact, easy-to-use and inexpensive cartridge-supplied microfilm recording camera, many of the features of the present invention are not limited to a microfilm recording camera, or, in fact, to a document recording system. Many of the disclosed novel features of this invention may be incorporated in other devices where a web material to be driven is supplied in a removable pre-threaded cartridge.

Other objects, features and advantages of the present invention will be readily apparent from the following detailed description of a preferred embodiment thereof, taken in conjunction with the accompanying drawings in which:

FIG. 1 is a diagrammatic cut-away front section view of the microfilm apparatus encompassing the present invention, illustrating the relative position of the film cartridge and the light path for projecting an image onto the film;

FIG. 2 is a detail view of the film drive mechanism of the housing and cartridge, with a view also of the lens system of the apparatus;

FIG. 3 is a view of the microfilm apparatus and cartridge assembly of the present invention taken along the line 3—3 in FIG. 2, illustrating in particular the novel cartridge latch and release mechanism;

FIG. 4 is a detail view of part of the film drive mechanism and cartridge construction of the present invention taken along the line 4—4 in FIG. 1;

FIG. 5 is a detail view of still another part of the film drive mechanism of the present invention, taken along the lines 5—5 in FIG. 1;

FIG. 7 is a detail view of the measuring capstan-motor control switch actuation system of the present invention taken along the line 7—7 in FIG. 2; and FIG. 8 is an alternative embodiment of the film drive mechanism of the present invention.

Figure 6:
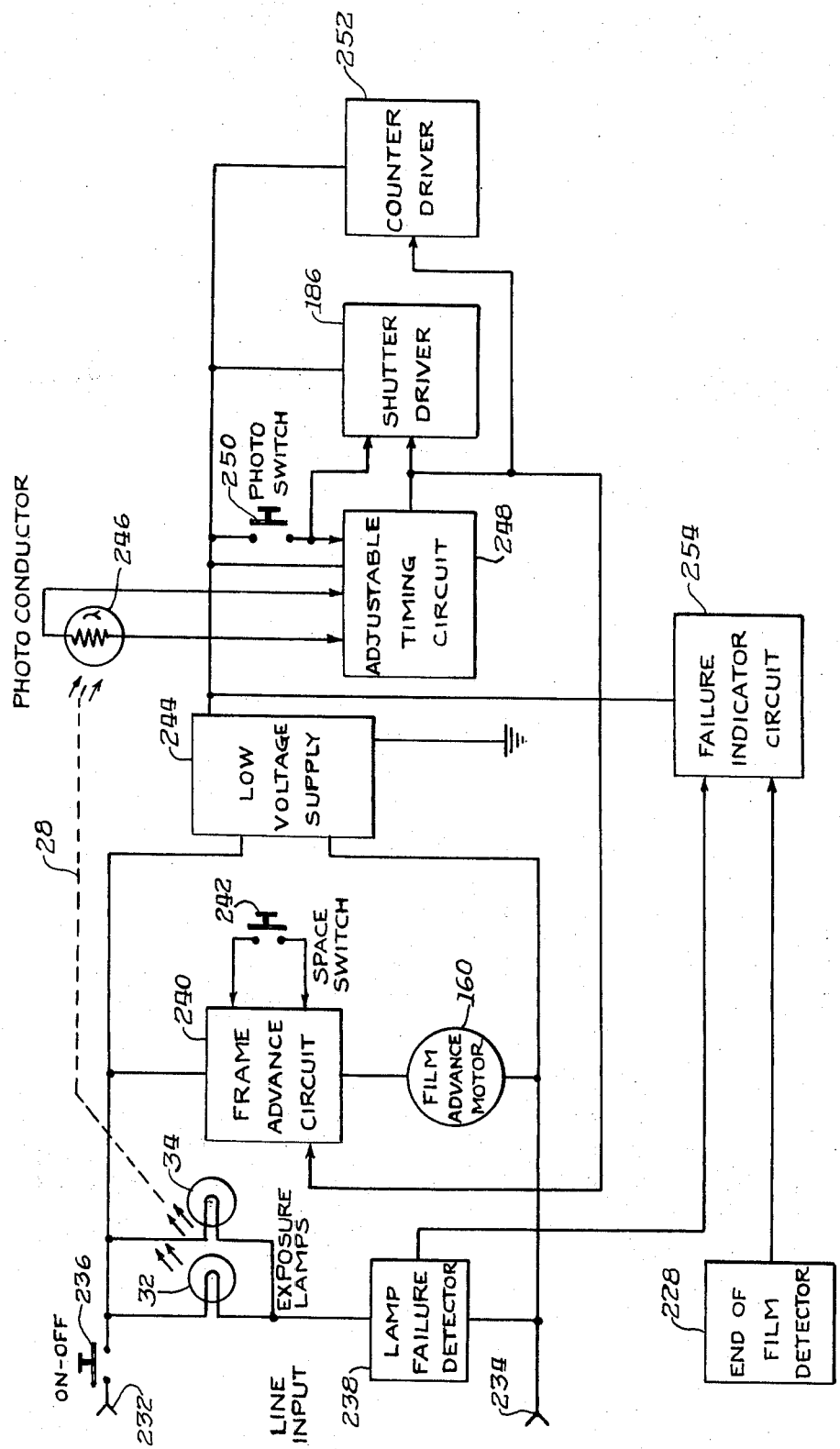
FIG. 6 is a schematic diagram of a proposed control system for the microfilm apparatus embodying the present invention.

Referring to FIG. 1, the microfilm camera encompassing the present invention is generally designated by the number 10, and includes a housing 12 having a base 14, side walls 16, 18 and an upper horizontal top wall 20. Legs 22 composed of rubber, plastic, or other suitable material, are fixed to the four corners of base 14 to support housing 12 on a desk, table or the like. Side walls 16, 18 extend outward from base 14 a short distance to a point 24 where they angle inwardly and meet top wall 20. This design of the side walls presents a pleasing design for housing 12.

Top wall 20 is generally rectangular in shape, although its overall configuration is not particularly material to its performance in the presently disclosed invention. A portion of top wall 20 is cut-away, as at 26, and a transparent glass or heat resistant plastic exposure platen 28 is inserted in cut-away portion 26. Exposure platen 28 is adapted to receive a document or other article which is to be copied on microfilm in a greatly reduced size. If desired, a document-holding cover (not shown) may be hinged to top wall 20 adjacent one end of platen 28. The cover is preferably removable, permitting the photographing of book material. Angled brackets 30 are fixed to top wall 20 and retain exposure platen 28 in position such that the upper surface of the exposure platen is flush with the upper surface of top wall 20. Exposure platen 28 is generally rectangular in shape and is preferably large enough to receive various sizes of documents within its borders. In addition, the rear edge of platen 28 is located as close to the rear edge of housing 12 as possible. This permits copying of a book folded over the rear surface of the camera.

Disposed on either side of the lower portions of housing 12 are a pair of light sources comprising lamps 32, 34, such as display case lamps, by way of example. These lamps comprise the source of illumination for exposure platen 28. Attached to the walls 16, 18 adjacent and slightly above lamps 32, 34 are reflecting means such as mirrors 36, 38 which direct light from lamps 32, 34 to exposure platen 28 along the light paths designated by the numerals 40 through 47. Mirrors 36, 38 are attached to the inner surface of walls 16, 18, and the angle at which these walls extend locates the mirrors at the proper angle relative to lamps 32, 34 such that the reflected light illuminates the entire area of exposure platen 28.

Lamps 32, 34, and mirrors 36, 38 form a "folded light track" illumination source for exposure platen 28. Considering only the left side of the illumination system disclosed in FIG. 1, the real position of the light source is shown as lamp 32. Th virtual image of this same light source is designated by the numeral 48, and the virtual light paths for illuminating exposure platen 28 are designated 41', 43', 45', and 47'. Image 48 indicates the required location of lamp 32 to illuminate exposure platen 28 were it not for the "folded light track" illumination system of the present invention, incorporating mirrors 36, 38.

Illumination baffles 50 are provided adjacent lamps 32, 34 for absorbing a portion of the light eminating from the lamps. Each baffle 50 has a lower portion 52 which is fixed to base 14, and a portion 54 which extends upward and outward relative to base 14, partially over respective lamps 32, 34. An additional portion 56 of each baffle 50 extends downward and outward from the uppermost extent of portion 54, and extends over respective lamps 32, 34, as shown in FIG. 1.

The surface of each illuminating baffle 50 facing lamps 32, 34, as well as the interior surfaces of walls 14, 16, 18, and 20, are coated with a suitable light absorbing substance, such as black paint. Any light reaching these surfaces is absorbed and not reflected to exposure platen 28, thereby eliminating the possibility of stray light reaching the exposure platen. The seams of housing 12 are covered with the light absorbing substance to form a light seal internally of the camera.

Light from exposure platen 28 is reflected onto a first relay mirror 60 which is preferably trapezoidal in shape and disposed at a predetermined angle from the horizontal in the base of housing 12. The light is then reflected to a second relay mirror 62 which is fixed to the forward wall 64 of housing 12 at a predetermined angular position. From second relay mirror 62, the light is focused through a lens 66 fixed to interior wall 67 of housing 12 and then onto a segment of microfilm 68 (FIG. 2) disposed in cartridge 70.

Cartridge 70 is adapted to be inserted into a chamber 72 formed in housing 12 which chamber is specially formed to receive the cartridge. A slot 74 is provided in side wall 18 through which the cartridge is inserted in and removed from the chamber. Chamber 72 is formed by a forward wall 76 and a rear wall 78 (FIG. 4) in housing 12. A lower wall 80 fixed to housing 12 forms a support element for cartridge 70, and an upper wall 82 fixed to the housing assists in holding and locating cartridge 70 in its proper position in the chamber.

A flange 84 extends upward from lower wall 80, and a like flange 86 extends downward from upper wall 82. As best seen in FIG. 1, flanges 84 and 86 hold cartridge 70 from further movement relative to lens 66 upon insertion of the cartridge in chamber 72, and maintain cartridge 70 in its proper position in housing 12.

The external seams at the borders of the walls and supports forming chamber 72 are light tight and covered with a light absorbing substance, such that the light seal internally of housing 12 is not broken by chamber 72. This is an important feature of the present invention inasmuch as it provides a means for enabling the insertion and removal of cartridge 70 from chamber 72 without disturbing the light seal surrounding the projection system in housing 12.

Cartridge 70 is preferably a rectangular shaped hollow container made of plastic or other like substance. The casing of cartridge 70, in the illustrative embodiment, comprises two U-shaped shells 92, 94 bonded together at their points of juncture, such as denoted by the numeral 96 in FIGS. 4 and 5. Formed in the lower portion of cartridge 70 is a spindle 98 about which a supply reel 100 of film 102 is rotatably mounted. Film 102 passes in a path from supply reel 100 around guide roller 104, and then past exposure station 106, the latter being fixed internally of cartridge 70. Film 102 is next fed around measuring capstan 108, which is rotatably mounted in cartridge 70, and includes a friction surface such as rubber or the like applied to the circumference thereof for purposes to be explained in greater detail. From capstan 108, the film path continues around guide roller 110 to take-up spool 112 rotatably mounted on spindle 114. Take-up spool 112 includes slotted means 116 therein for firmly engaging the lead end of film 102.

A portion of take-up spool 112 extends through shell 92 of cartridge 70 and has a drive gear 118 attached thereto. It is apparent that rotative movement imparted to spool 112 through gear 118 will cause the spool to rotate, thereby driving film 102 through the film path previously described.

Cartridge 70 has an indented portion 90 formed on the side adjacent drive gear 118, and the drive gear fits into the indented portion so that the outermost axial extent of the drive gear is flush with the plane of the remainder of the cartridge casing. This enables the drive gear to easily engage the film drive means when the cartridge is inserted in chamber 72.

A drive mechanism for imparting rotative movement to drive gear 118 is provided in housing 12, with the capability of engaging the drive gear as the cartridge 70 is inserted in chamber 72. An aperture 120 is located in wall 78 (FIG. 5) through which a drive shaft 122 extends. Surrounding aperture 120 and extending therethrough is rotatable pinion bracket support 124 which includes two circular boss members 126, 128 rigidly fixed to pinion bracket 130. Pinion bracket 130 is rotatably mounted about drive shaft 122, enabling the lower or extendable portion of pinion bracket 130 to move in an arcuate path about drive shaft 122.

Connected to pinion bracket 130 is pinion shaft 132 about which pinion gear 134 is rotatably mounted. Drive gear 136 is rigidly fixed to one end of drive shaft 122, and engages pinion gear 134 to impart rotative motion thereto. As is apparent from FIG. 2, pinion gear 134 also engages drive gear 118 as cartridge 70 is inserted in chamber 72; gears 134 and 118 being disposed in indented space 90 relative to cartridge 70.

As viewed in FIG. 2, pinion bracket 130 is spring-biased by means of coil spring 138 to rotate in a clockwise direction, the axis of pinion gear 134 being rotatable about shaft 122 in an arcuate path. Pin 140 extending from wall 78 defines the limit of arcuate movement of bracket 130 when cartridge 70 is removed from chamber 72. As cartridge 70 is inserted in chamber 72, drive gear 118 engages pinion gear 134 and moves it and bracket 134 in a counter-clockwise direction, as viewed in FIG. 2., against the bias force of coil spring 138. Coil spring 138 functions to maintain pinion gear 134 engaged with drive gear 118 when cartridge 70 is inserted in chamber 72 and drive gear 136 is rotated.

Power is supplied to drive gear 136 by means of pulley 142 fixed to one end of drive shaft 122. A cable 144 extends around pulley 142, and also around pulley 146 which is fixed to a shaft 148 (FIG. 4). Shaft 148 is rotatably mounted on wall 150 forming a part of housing 12 and defining a drive mechanism chamber therein. Connected to pulley 146 by means of splines 152 is a gear 154 which is driven by worm gear 156. Motor shaft 158 is connected at one end to worm gear 156 and at the other end to film advance motor 160.

Electric power supplied to motor 160 rotates shaft 158 and worm gear 156, which in turn rotates gear 154 and pulley 146. Cable 144 transmits the rotative movement to pulley 142 (FIG. 2), which provides the motive power for advancing film 102 in cartridge 70.

Inasmuch as the disclosed device is a microfilm camera intended to photographically record images on segments of film 102, means are provided to incrementally advance the film in cartridge 70 by means of the power apparatus just described, and to interrupt the power means when the film has been advanced a sufficient amount, preferably equal to the length of one exposure frame, which includes the distance equal to the space between adjacent frames. To this end, referring to FIGS. 2 and 7, measuring capstan 108 in cartridge 70 has attached thereto a shaft 162 which extends through the cartridge. Fixed to the other end of shaft 16 and disposed in indented space 90 external of cartridge 70 is gear 163. The axial extent of gear 163 is flush with the plane of the casing of cartridge 70. Forward wall 78 of housing 12 includes a shaft 167 extending therefrom, to which is rotatably mounted pinion gear 165 adapted to engage and be driven by gear 163.

Shaft 167 also has mounted thereon a four-peak cam 164 which is fixed to pinion gear 165 for rotation therewith. Since the outer faces of both gears 118 and 163 of cartridge 70 are flush with the side wall casing of cartridge 70, the cartridge 70 may be inserted in and withdrawn from chamber 70 with ease due to the lack of parts protruding from the cartridge. A switch 166 controlled by cam follower trip lever 168 is located on upper wall 82 adjacent chamber 72. Switch 166 is electrically connected to motor 160 and functions as a control means for the motor by interrupting the operation of the motor when the peaks of rotating cam 164 engage trip lever 168 and force the lever into the position shown in FIG. 2.

At the end of each exposure, a "photo" switch 250 (FIG. 6) is provided to override the signal from switch 166, and to resupply power to motor 160, so that the film may be incrementally advanced. When motor 160 functions to drive film 102 along the film path described previously, the film moves around a substantial portion of measuring capstan 108, whereupon it is engaged by the friction surface applied to the circumference of the capstan. As a result of the intimate contact between the moving film and the friction surface of capstan 108, the capstan is rotated. As capstan 108 rotates, cam 164 likewise rotates, allowing trip lever 168 to move downward into the dwell between two of the peaks of cam 164. The previously described overriding switch 250 is disengaged, and the film advances until the next peak of cam 164 trips lever 168 to actuate switch 166 to again stop motor 160 and arrest the further advance of film 102. The relationship between the circumferential distance of capstan 108 and the position of the peaks of cam 164 is established such that the distance film 102 moves during each incremental advance is equal to the distance of one exposure frame. In this manner, the images will be recorded on the film at equal intervals. In the disclosed embodiment, each exposure distance or frame dimension is proportional to one-quarter turn of cam 164.

As the film moves along the previously described film path, means are provided to firmly hold the film in a flat position adjacent lens 66 during exposure. Cartridge 70 includes an exposure window 170 (FIG. 2) extending through the casing thereof adjacent exposure station 106. An aperture block 172 fixed to frame 174 of lens 66 by means of bracket 175 extends through exposure window 170 when cartridge 70 is inserted in chamber 72 and positioned against flanges 84 and 86. Aperture block 172 includes a hollow portion 176 extending therethrough between lens 66 and film 102 which allows an image to be projected through the block and onto the film.

To hold film 102 firmly in place against exposure station 106 during exposure, face of aperture block 172 has applied thereto a pliable substance 180 such as rubber, sponge, or the like, which directly engages film 102 and holds it against exposure station 106. As seen in FIG. 3, the lateral edges of pliable substance 180 have protuberances 182 which extend along both sides of film 102 outside the exposure area of each frame of the film. The force applied against film 102 by pliable substance 180 is sufficient to hold the film firmly against exposure station 106 during exposure, while permitting the substance to yield to allow the film to advance following exposure without requiring movement of lens 66 or aperture block 172.

As is common in most cameras, a movable shutter 184 is provided between lens 66 and film 102 adjacent aperture block 172. Shutter 184 is controlled by electrically operated solenoid 186 and return spring 188. It is apparent that when solenoid 186 is actuated, shutter 184 is displaced downward (FIG. 2) against the bias of spring 188, opening exposure window 170 and exposing film 102 to the image projected through lens 66. When solenoid 186 is de-energized, spring 188 causes shutter 184 to return to its normal position covering aperture window 170.

To properly position cartridge 70 in chamber 72, and to hold the cartridge while the film is being exposed or driven by the aforesaid drive mechanism, a novel latch means is provided for use in conjunction with the disclosed embodiment of the present invention. Referring to FIGS. 2 and 3, a latch bracket 190 is fixed to wall 78 of chamber 72 adjacent an elongated opening 192 in the wall. Latch lever 194 is pivotally connected by means of pin 196 to bracket 190. One end 198 of lever 194 is bluntly pointed and is adapted to move from a first position (shown in phantom in FIG. 3) to a second position, the latter illustrated in solid lines in FIG. 3. In its first position, the end 198 of lever 194 does not extend into elongated opening 190. However, when moving into its second position, latch lever 194 is adapted to extend into the opening and engage slot 200 which is formed in the side of cartridge 70. When in the second position shown in FIG. 3, the lever 194 holds the cartridge firmly in place against flanges 84, 86 to ensure proper exposure of film 102.

Latch bracket 190 comprises an extension 202 which has a spring pin 204 located adjacent one end thereof. A second spring pin 206 is fixed to the bluntly pointed end of latch lever 194, and a spring 208 extends between the two pins. Referring to FIG. 3, in the first (dotted) position of lever 194, spring 108 is disposed left of pivot pin 196, thereby imparting a counter-clockwise force tending to keep latch lever 194 withdrawn from opening 192 so that the forward wall of cartridge 70 will not engage the latch lever as the cartridge is being inserted in chamber 72.

To provide the mechanical force necessary to move latch lever 194 into engagement with slot 200, a latch actuator means 210 is pivotally connected to bracket 190 by means of pin 212. Permanently fixed to one end of actuator 210 is a leaf spring 214 which engages latch lever 194 as shown in the two positions of the latch actuator shown in solid and dotted lines in FIG. 3. The other end of latch actuator 210 is adapted to be displaced through elongated opening 192.

In the position of latch actuator 210 shown by dotted lines in FIG. 3, one end of the actuator extends into chamber 72 through opening 192 and is moved in a clockwise direction by the forward wall of cartridge 70 when the cartridge 70 is inserted in the chamber. Leaf spring 214, which abuts latch lever 194, forces the latch lever to move in a clockwise direction such that the bluntly pointed end 198 thereof engages slot 200 as the cartridge moves into chamber 72. As cartridge 70 reaches flanges 84, 86, is stops. However, at this point, latch lever 194, under the influence of latch actuator 210 and leaf spring 214, has moved to its second position whereby spring 208 has moved to the right of pin 196 (as viewed in FIG. 3), applying a clockwise force to latch lever 194. This clockwise force has a tendency to maintain cartridge 70 in abutment with flanges 84, 86, which keeps the cartridge in its proper position in chamber 72. Since latch actuator 210 is incapable of moving counter-clockwise due to the position of cartridge 70 adjacent opening 192, leaf spring 214 is maintained in position whereby the spring 214 also exerts a clockwise force on latch lever 194.

Extending through housing 12 is a release rod 216 which terminates adjacent one end of latch lever 194. To release cartridge 70 from chamber 72, rod 216 is manually pushed to the right (FIG. 3), and latch lever 194 is pivoted counter-clockwise against the bias of springs 208 and 214. As latch lever 194 moves counter-clockwise, the end 198 inserted in slot 200 moves the cartridge to the left and partially expels the cartridge from chamber 72. Enough of the cartridge extends from slot 74 so that it can be gripped by hand and removed manually.

The cartridge and housing also coact to provide means for initiating a signal when the microfilm on the supply reel in the cartridge is substantially exhausted. To this end, the casing of cartridge 70 prevents the supply reel of film from moving laterally, such that no radially extending reel structure is necessary. The same is true for the film as it is accumulated on take-up spool 112. Since there are no reel structures, the spindles 98 and 114 for the supply reel and take-up spool respectively in cartridge 70 are spaced apart a distance less than twice the radial distance of accumulated film on reel 100 and take-up spool 112. A floating bias means in the form of bent spring 218 is disposed between the outer circumferences of film on supply reel 100 and take-up spool 112. Spring 218 applies a constant compression force to the accumulated film, and moves downward (as viewed in FIG. 1) as the film 102 is displaced from the supply reel to the take-up spool.

Extending downward from spring 218 adjacent the side of supply reel 100 is an arm 220 terminating with a laterally extending flange 222. This flange protrudes through an elongated slot 224 in shell 92 and is adapted to engage trip lever 226 of end-of-film detector switch 228 which is attached to housing wall 78. An aperture 230 is provided in wall 78 adjacent switch 228, and trip lever 226 extends through this aperture. Switch 228 is electrically connected to a device (not shown) for generating an audible or visual signal, or both, when a predetermined amount of unexposed film remains in cartridge 70.

Thus, when film 102 has been substantially accumulated on take-up spool 112, spring 218 will have been displaced downward as the radius of supply reel 100 diminishes. Arm 220, which is connected to spring 218, also moves downward until flange 222 engages trip lever 226 of switch 228. The switch then actuates the end-of-film signal, which alerts the operator that the cartridge 70 should be removed from chamber 72 and a new cartridge inserted.

Bent spring 218 is also rigidly connected to film footage meter 231 comprising linearly disposed numerals 233 visible through a window in cartridge 70. Numerals 233 may be calibrated to indicate either the film footage remaining in the cartridge, or the amount of film used. As spring 218 moves downward in response to the diminishing radius of supply reel 100, meter 231 advances downward and displays numerals 233 in sequence through the window of the cartridge. Th window in the cartridge is directly adjacent window 235 in forward wall 76, with a corresponding window 235 in forward wall 64. The windows 235 permit the film footage meter to be viewed from outside camera housing 12 through the window in cartridge 70 when the cartridge is inserted in the camera.

The control system for the microfilm apparatus which embodies the elements of the present invention is diagrammatically set forth in FIG. 6. The control system includes terminals 232, 234 which are connected to a source of electrical power. On-off switch 236 is located in the main power line, and is depressed to energize the system. Exposure lamps 32, 34 are connected across the main power line in series with lamp failure detector 238. Detector 238 preferably comprises a standard relay which fails to "pull in" if no current is being drawn across the lamps. Frame advance circuit 240, which controls film advance motor 160, is connected across terminals 232, 234, and is actuated by capstan-actuated switch 166 (FIG. 2). The frame advance circuit is also manually controlled by a space switch 242.

A low voltage supply 244 furnishes power to an automatic exposure system including photoconductive cell 246, adjustable timing circuit 248, shutter drive solenoid 186 (FIG. 2), and "photo" switch 250. Low voltage supply 244 also powers image counter driver 252 and failure indicator circuit 254. End-of-film detector switch 228 (FIG. 4) controls the failure indicator circuit. Image counter driver 252 renders a precise indication of the number of images recorded on film 102, as distinguished from the film footage meter, which indicates the amount of film remaining in the cartridge. In operation, actuating on-off switch 236 energizes exposure lamps 32, 34, as well as low voltage circuit 244. If cartridge 70 is not properly inserted in chamber 72, or has no usable film, or if one or both of lamps 32, 34 are burned out, a visual or audible indication will be given by lamp failure detector 238 or failure indicator circuit 254. When "photo" switch 250 is manually depressed, timing circuit 248 is energized which activates solenoid 186 and opens shutter 184 for a period of time determined by the amount and color of light reflected from the document on platen 28 (FIG. 1) to photoconductive cell 246. At the end of the timing period, shutter 184 is closed and simultaneously frame advance circuit 240 and image counter driver circuit 252 are activated. Alternatively, counter driver circuit 252, which automatically counts each photograph on an item-by-item basis, may be activated whenever shutter 184 is open. If desired, "photo" switch 250 may be a foot-operated switch, permitting higher speed photography in that the operator has both hands free to handle the documents.

In response to activation of frame advance circuit 240, motor 160 advances film 102 in cartridge 70 a prescribed distance equal to one exposure frame. Switch 166 (FIG. 2), actuated by capstan cam 164, ultimately de-activates the frame advance circuit and stops motor 160. "Photo" switch 250 is again depressed by the operator to expose the frame of film adjacent lens 66, and the cycle is repreated each time it is desired to photographically record an image on a frame of film in cartridge 70. If it is desired to advance film 102 without exposing the film, space switch 242 is depressed, the film will advance as little as one frame, or continuously as long as switch 242 is depressed.

The cartridge 70 includes a curtain device 256 which enables the cartridge to be inserted in and removed from chamber 72 without exposing the segment of film adjacent exposure window 170. Curtain 256 is adapted to slide into position over exposure window 170 whenever cartridge 70 is removed from the camera. As best viewed in FIG. 2, curtain 256 comprises a length of spring steel extending between two guide walls 258, 260 in cartridge 70. The upper end of the curtain, when fully extended, moves into position in front of exposure window 170, and prevents light from entering the cartridge. The opposite end of curtain 256 is held to cartridge 70 by means of post 262 and pin 264. The lower part of cartridge 70 includes an indented portion 266 which is adopted to receive curtain actuator rod 268 attached to interior wall 67 of camera housing 12.

When cartridge 70 is removed from chamber 72, curtain 256 extends straight up from post 262 between guide walls 258, 260, and covers exposure window 170.

As cartridge 70 is inserted in chamber 72, curtain actuator rod 268 extends into indented portion 266 of the cartridge, and forces the curtain into the position shown in FIG. 2, withdrawing the curtain from adjacent exposure window 170 and allowing aperture block 172 to be inserted through the exposure window. The inherent spring characteristics of curtain device 256 enable it to move into place covering exposure window 170 when cartridge 70 is removed from chamber 72; no mechanical apparatus is necessary to return the curtain device to its protective position covering the exposure window.

In an alternative embodiment of the present invention, motor 160 drives film 102 by delivering power to capstan 108, with a secondary connection, through a slip-drive mechanism, to take-up spool 112. Referring to FIG. 8 wherein like numerals are used to identify similar elements, motor 160 drives pulley 146 by means of shaft 158, worm gear 156 and gear 154 as previously described. Cable 144 extends around pulley 154 at one end, and at the other end extends around pulley 142 to drive gear 136. Gear 136 rotates pinion gear 134, which is mounted on pinion bracket 130. Bracket 130 is rotatably disposed on shaft 122, which shaft is rotatably mounted on housing 12. Pinion bracket 130 is biased by coil spring 138 in a clockwise direction, as viewed in FIG. 8. The central axis of pinion gear 134, therefore, is adapted to pivot in an arcuate path around shaft 122 for engagement with gear 163, which is attached to capstan 108 by means of shaft 162, when cartridge 70 is inserted in the camera. Coil spring 138 maintains pinion gear 134 engaged with gear 163 as power to drive film 102 is delivered to capstan 108. The friction surface on capstan 108 engages film 102, and advances the film from supply reel 100 (FIG. 2).

Means are also provided in the alternative embodiment to drive take-up spool 112 through a slip-clutch mechanism whereby the exposed film 102 is properly accumulated in cartridge 70. To this end, a pulley 300 is rigidly affixed to pulley 142, and disposed coaxial therewith. As power is delivered to pulley 142 by cable 144, pulley 300 also rotates. Extending around and driven by pulley 300 is a friction drive means comprising spring belt 302 which extends around pulley 304 at its opposite end. Other known friction drive means, such as an O-ring belt, may be used in place of spring belt 302. Pulley 304 is attached to gear 306, which is rotatable about housing mounted shaft 308. Also rotatably mounted on shaft 308 is pinion bracket 310, to which pinion gear 312 is mounted, pinion gear 312 being engaged and driven by gear 306. Coil spring 314 is disposed between shaft 308 and pinion bracket 310 to bias the pinion bracket and pinion gear 312 in a clockwise direction, a viewed in FIG. 8. In accordance with this construction, the central axis of pinion gear 312 pivots in an arcuate path about shaft 308. In an alternative embodiment, illustrated by dotted line in FIG. 8, pulley 300 is fixed to gear 154, which is driven by motor 160 through worm gear 156. Friction drive belt 302 extends around pulley 300 and pulley 304 to drive gear 306 as previously described. Thus, in the alternative embodiment, the friction drive for the take-up spool comes directly from gear 154.

As cartridge 70 is inserted in chamber 72, take-up spool drive gear 118 engages pinion gear 312 and is driven thereby as coil spring 314 maintains the pinion gear in contact with gear 118. Pulley 304 is smaller than pulley 300, which results in take-up spool 112 being driven at a greater linear velocity than capstan 108. This is necessary to permit exposed film 102 to properly accumulate on take-up reel 112. To prevent film 102 from breaking, spring belt 302 is constructed so that it slips around pulley 304 when the tension on the film approaching take-up spool 112 reaches a predetermined amount. Therefore, spring belt 302 always exerts a tension force on film 102 at the take-up spool, but is allowed to slip before the tension force reaches the breaking strength of the film.

Still other modifications to, and uses of, the present invention will readily occur to those skilled in the art. Therefore, the appended claims are to be construed to cover all equivalent structures falling within the scope and spirit of the invention.

We claim:

1. In a microfilm apparatus for recording a projected image on a film disposed in a cartridge adapted to be inserted in said apparatus:
   a housing including means for projecting said image onto said film;
   chamber means in said housing for receiving said cartridge;
   said film being threaded in a path in said cartridge from a supply reel to a take-up spool;
   means in said cartridge to advance said film along said path;
   power means mounted on said housing and adapted to be operably connected to said means to advance said film;
   a rotatable measuring capstan disposed in said cartridge in contact with said film whereby said capstan rotates as said film advances from said supply reel to said take-up spool; and
   control means associated with said measuring capstan and connected to said power means for discontinuing said power to said means to advance said film after said measuring capstan is rotated a predetermined amount, wherein said control means associated with said measuring capstan includes
   switch means connected to said power means;
   a trip lever adapted to operate said switch;
   cam means operably connected to said measuring capstan and rotatable therewith;
   said cam means disposed to contact said trip lever and to alternately operate said switch between on and off positions as said cam rotates, whereby the supply of power to said means to advance said film is interrupted when said switch is in one of said positions.

2. The microfilm apparatus of claim 1, including:
   additional control means adapted to re-apply said power means to said means to advance said film after an image has been recorded on said film.

3. The microfilm apparatus of claim 1 wherein said cam is adapted to permit said measuring capstan to rotate a predetermined amount before said supply of power to said means to advance said film is interrupted.

4. The microfilm apparatus of claim 1 including:
   an exposure station of predetermined length in said cartridge disposed adjacent a portion of said film path;

an exposure window in said cartridge adjacent said exposure station and said film path whereby said image is projected from said housing through said exposure window to said film;

said cam adapted to interrupt said supply of power to said means to advance said film after said film has advanced a distance substantially equal to the length of said exposure station.

5. The microfilm apparatus of claim 1 including:

an exposure station of predetermined length in said cartridge disposed adjacent a portion of said film path;

an exposure window in said cartridge adjacent said exposure station and said film path whereby said image is projected from said housing through said exposure window to said film;

the relationship between said cam and the circumferential dimension of said measuring capstan being such that the supply of power to said means to advance said film is interrupted after said film has advanced a distance substantially equal to the length of said exposure station.

6. In a microfilm apparatus for recording a projected image on a film disposed in a cartridge adapted to be inserted in said apparatus:

a housing including means for projecting said image onto said film;

chamber means in said housing for receiving said cartridge;

said film being threaded in a path in said cartridge from a supply reel to a take-up spool;

means in said cartridge to advance said film along said path;

power means mounted on said housing and adapted to be operably connected to said means to advance said film;

a rotatably measuring capstan disposed in said cartridge in contact with said film whereby said capstan rotates as said film advances from said supply reel to said take-up spool, said measuring capstan includes a circumferential friction surface for positive engagement with said film; and control means associated with said measuring capstan and connected to said power means for discontinuing said power to said means to advance said film after said measuring capstan is rotated a predetermined amount.

7. The microfilm apparatus of claim 6 wherein said positive engagement between said film and said circumferential friction surface causes said measuring capstan and said control means associated therewith to rotate as said film advances from said supply reel to said take-up spool.

8. The microfilm apparatus of claim 6 wherein said friction surface comprises a rubber-like coating material extending about the circumference of said measuring capstan.

9. In a microfilm apparatus for recording a projected image on a film disposed in a cartridge adapted to be inserted in said apparatus:

a housing including means for projecting said image onto said film;

chamber means in said housing for receiving said cartridge;

said film being threaded in a path in said cartridge from a supply reel to a take-up spool;

means in said cartridge to advance said film along said path;

power means mounted on said housing and adapted to be operably connected to said means to advance said film, said power means includes, motor means fixed to said housing;

first gear means rotatably driven by said motor means about a first axis;

said first axis being fixed relative to said housing;

second gear means rotatably mounted about a second axis and drivingly connected to said first gear means;

said second axis pivotally disposed relative to said first axis;

means biasing said second axis and said second gear means in one arcuate direction about said first axis;

third gear means connected to said means to advance said film in said cartridge and adapted to engage said second gear means when said cartridge is inserted in said apparatus;

a rotatable measuring capstan disposed in said cartridge in contact with said film whereby said capstan rotates as said film advances from said supply reel to said take-up spool; and control means associated with said measuring capstan and connected to said power means for discontinuing said power to said means to advance said film after said measuring capstan is rotated a predetermined amount.

10. The microfilm apparatus of claim 9 wherein said third gear means moves said second gear means against the force of said biasing means when said cartridge is inserted in said apparatus, pivotally rotating said second gear means in an arcuate path about said first axis.

11. The microfilm apparatus of claim 10 wherein said biasing force insures positive engagement between said second gear means and said third gear means.

12. In a microfilm apparatus for recording a projected image onto a film disposed in a cartridge adapted to be inserted in said apparatus:

a housing including means for projecting said image on said film;

chamber means in said housing for receiving said cartridge;

said film being threaded in a path in said cartridge from a supply reel to a take-up spool;

means in said cartridge to advance said film along said path;

power means mounted on said housing and adapted to be operably connected to said means to advance said film;

signal means associated with said housing adapted to generate a preciptible signal when activated, said signal means includes, a trip actuated switch; and an electrically powered means adapted to generate an audible or visual signal when said switch is tripped;

means associated with said cartridge and responsive to the displacement of said film from said supply reel to said take-up spool for activating said signal means when said film is substantially accumulated on said take-up spool.

13. The microfilm apparatus of claim 12 wherein said means responsive to said film displacement includes:

an arm disposed in said cartridge adjacent said supply reel;

said arm having a first flange which is biased onto contact with the outer circumference of film on said supply reel;

a second flange extending through an elongated opening in said cartridge and movable throughout the length of said opening in response to the displacement of film from said supply reel to said take-up spool;

said second flange of said arm being adapted to trip said switch and generate an audible or visual signal when said film is substantially completely accumulated on said take-up spool.

14. In a microfilm apparatus for recording projected image onto a film disposed in a cartridge adapted to be inserted in said apparatus:

a housing including means for projecting said image on said film;

chamber means in said housing for receiving said cartridge;

said film being threaded in a path in said cartridge from a supply reel to a take-up spool;

means in said cartridge to advance said film along said path;

power means mounted on said housing and adapted to be operably connected to said means to advance said film;

means retaining said supply reel and said take-up spool in said cartridge on spaced rotational axes at a distance less than twice the radial dimension of accumulated film on said reel and spool;

floating bias means in said cartridge disposed between said film on said supply reel and said film on said take-up spool for applying a constant compression force to the accumulated film on said reel and spool;

said floating bias means adapted to move from a first position when substantially all of said film is accumulated on said supply reel to a second position when substantially all of said film is accumulated on said take-up spool;

signal means associated with said housing adapted to generate a perceptible signal when actuated;

arm means connected to said bias means for actuating said signal means when substantially all of said film is accumulated on said take-up spool.

15. The microfilm apparatus of claim 14 wherein said arm means includes a first flange portion radially disposed adjacent said supply reel, and a second flange portion extending from an opening in said cartridge;

said second flange portion adapted to actuate said signal means when said bias means is moved to said second position.

16. In a microfilm apparatus for recording a projected image on a film disposed in a cartridge adapted to be inserted in said apparatus;

a housing including means for projecting said image is projected onto said film;

an exposure station disposed in said cartridge adjacent said opening adapted to support said film in the proximity of said opening;

means for projecting said image including lens means fixed to said housing and a lens frame to support said lens means;

said lens means disposed in said light path and adjacent said cartridge opening for focusing said image on said film;

aperture block means associated with said lens frame having a face disposed in a plane parallel with the plane of said film;

first means for urging said film against said exposure station;

said aperture block means adapted to be inserted in said opening and adapted to firmly hold said film against said exposure station when said cartridge is inserted in said apparatus.

17. The microfilm apparatus of claim 16 including shutter means disposed between said lens means and said cartridge opening for controlling the projection of said image onto said film.

18. The microfilm apparatus of claim 16 wherein:

said first means includes a pliable material disposed over the surface of said face;

said aperture block has an opening therein through which said image is projected from said lens to said film;

said opening extending through said face whereby the portion of said face surrounding said opening is covered by said pliable material.

19. The microfilm apparatus of claim 16 wherein:

said first means includes a pair of protuberances for engaging said film in an area beyond that upon which said image is projected.

20. The microfilm apparatus of claim 16 including:

power means adapted to incremently move said film past said exposure station;

said face of said aperture block being adapted to slidably hold said film against said exposure station when said cartridge is inserted in said apparatus.

21. In a microfilm apparatus for recording a projected image on a film disposed in a cartridge casing adapted to be inserted in said apparatus;

a housing;

a chamber in said housing for receiving said cartridge;

said chamber partially defined by at least one support element affixed to said housing;

bracket means affixed to said support element;

said cartridge having a recess disposed in said casing;

latch means connected to said bracket means and adapted to engage said recess when said cartridge is inserted in said chamber for holding said cartridge firmly in said chamber; and release means associated with said latch and operable to release said cartridge from said chamber.

22. The microfilm apparatus of claim 21 wherein:

said support element is an interior wall member of said housing having an elongated slot therein;

said slot disposed adjacent said recess when said cartridge is inserted in said chamber;

said bracket being affixed to said wall member in proximate relation to said elongated slot whereby said latch means extends through said slot to engage said recess.

23. The microfilm apparatus of claim 21 wherein said latch means includes:

a latch lever pivotally mounted on said bracket;

first means biasing said latch lever to a first position whereby said latch lever is out of engagement with said recess;

second means opposed to said first biasing means and biasing said latch lever to a second position whereby said latch lever engages said recess and whereby said latch lever moves to an over-center position to hold said cartridge firmly in said chamber;

said second biasing means being actuated by said cartridge as said cartridge is inserted in said chamber.

24. The microfilm apparatus of claim 23 wherein: said first biasing means comprises a spring extending between said bracket and spring holding means disposed near one end of said latch lever.

25. The microfilm apparatus of claim 23 wherein said second biasing means includes:
  a latch actuator pivotally mounted to said bracket;
  a leaf spring attached to said actuator and disposed in abutment with one end of said latch lever;
  a portion of said latch actuator extending into the path of said cartridge as said cartridge is inserted in said chamber, whereby the force on said latch lever due to said second biasing means increases as said latch actuator is pivoted by said cartridge thereby overcoming the force of said first biasing means on said latch lever and moving said latch lever into engagement with said recess.

26. The microfilm apparatus of claim 25 wherein: said first biasing means moves across the pivot point of said latch lever when said latch lever engages said recess, whereby the force exerted on said latch lever by said first biasing means reverses and assists in maintaining said cartridge in said chamber.

27. The microfilm apparatus of claim 21 wherein said latch means includes:
  a latch lever pivotally mounted to said bracket;
  first spring means extending between said bracket and spring holding means disposed near one end of said latch lever to bias said latch lever in a first pivotal direction;
  latch actuator means pivotally mounted to said bracket;
  leaf spring means having one end attached to one end of said latch actuator;
  the other end of said leaf spring means having a free end disposed in abuting engagement with the other end of said latch actuator;
  said leaf spring tending to bias said latch actuator in a second pivotal direction against the bias of said first spring means;
  the other end of said latch actuator extending into said chamber and into the path of said cartridge, whereby insertion of said cartridge in said chamber pivots said latch actuator so as to increase the force exerted on said other end of said latch lever by said leaf spring, thereby pivoting said latch lever into engagement with said recess.

28. The microfilm apparatus of claim 27 wherein said first spring means moves across said latch lever pivot point when said latch lever moves in said second pivotal direction, whereby the force applied to said latch lever by said first spring means is reversed and said spring means maintains said latch lever in engagement with said recess.

29. In a microfilm apparatus for recording a projected image on a film disposed in a cartridge adapted to be inserted in said apparatus;
  a housing;
  a chamber in said housing for receiving said cartridge;
  a film supply reel and a film take-up spool disposed in said cartridge;
  said film adapted to be driven along a film path in said cartridge from said supply reel to said take-up spool;
  a film footage meter disposed in said cartridge and adapted to indicate the amount of film remaining on said supply reel said film footage meter includes,
    spring means adapted to float between the radial extent of film on said supply reel and said take-up spool;
    a plate attached to said spring means and adapted to float therewith;
    said plate including numerals disposed thereon calibrated to indicate the amount of film used or remaining on said supply reel;
    said windows adapted to visually display said numerals; and
  window means in said housing and in said cartridge for visually displaying said indicated amount shown by said film footage meter.

30. The microfilm apparatus of claim 14 including:
  film footage meter means attached to said floating bias means and adapted to indicate the amount of film remaining on said supply reel; and
  window means in said housing and in said cartridge for visually displaying said indicated amount shown by said film footage meter.

31. The microfilm apparatus of claim 30 wherein said film footage meter includes:
  a plate attached to said floating bias means and adapted to move therewith;
  said plate including numerals disposed thereon calibrated to indicate the amount of film used or remaining on said supply reel;
  said windows adapted to visually display said numerals.

32. The microfilm apparatus of claim 1 wherein: said means to advance said film includes gear means connected to said take-up spool, whereby said power means is operably connected to said take-up spool gear means.

33. The microfilm apparatus of claim 32 wherein: said film intimately engages said capstan and rotates said capstan as said film advances along said path from said supply reel to said take-up spool.

34. The microfilm apparatus of claim 33 wherein said measuring capstan includes a circumferential friction surface adapted to positively engage said film.

35. The microfilm apparatus of claim 34 wherein said positive engagement between said advancing film and said circumferential friction surface provides the means for rotating said measuring capstan.

36. In a microfilm apparatus for recording a projected image on a film disposed in a cartridge adapted to be inserted in said apparatus:
  a housing including means for projecting said image onto said film;
  chamber means in said housing for receiving said cartridge;
  said film being threaded in a path in said cartridge from a supply reel to a take-up spool;
  means in said cartridge to advance said film along said path;

power means mounted on said housing and adapted to be operably connected to said means to advance said film;

a rotatable measuring capstan disposed in said cartridge in contact with said film whereby said capstan rotates as said film advances from said supply reel to said take-up spool; and control means associated with said measuring capstan and connected to said power means for discontinuing said power to said means to advance said film after said measuring capstan is rotated a predetermined amount;

said measuring capstan includes means on the surface therefor for positively engaging said film;

said means to advance said film includes gear means connected to said said power means being operably connected to said gear means, said power means includes;

motor means fixed to said housing;

first gear means rotatably driven by said motor means about a first axis;

said first axis being fixed relative to said housing;

second gear means rotatably mounted about a second axis and drivingly connected to said first gear means;

said second axis pivotally disposed relative to said first axis;

means biasing said second axis and said second gear means in one arcuate direction about said first axis;

third gear means connected to said measuring capstan and adapted to engage said second gear means when said cartridge is inserted in said apparatus; and additional means operably connected to said power means for rotating said take-up spool.

37. The microfilm apparatus of claim 36 wherein said third gear means moves said second gear means against the force of said biasing means when said cartridge is inserted in said apparatus, pivotally rotating said second gear means in an arcuate path about said first axis.

38. The microfilm apparatus of claim 37 wherein said biasing force insures positive engagement between said second gear means and said third gear means.

39. The microfilm apparatus of claim 36 wherein said additional means includes a slip-clutch between said power means and said take-up spool.

40. The microfilm apparatus of claim 36 wherein said additional means includes:

fourth gear means rotatably driven about a third axis by said power means;

said third axis being fixed relative to said housing;

fifth gear means rotatably mounted about a fourth axis and drivingly connected to said fourth gear means;

said fourth axis pivotally disposed relative to said third axis;

means biasing said fourth axis and said fifth gear means in one arcuate direction about said fourth axis;

sixth gear means connected to said take-up spool and adapted to engage said fifth gear means when said cartridge is inserted in said apparatus.

41. The microfilm apparatus of claim 40 wherein said fourth gear means is rotatably driven by said power means through a slip-clutch.

42. The microfilm apparatus of claim 41 wherein said slip-clutch includes:

first pulley means connected to said first gear means and rotatable therewith;

second pulley means connected to said fourth gear means and rotatable therewith; and spring belt means extending between said first and second pulleys, said spring belt adapted to slip about said second pulley when the tension force applied to said take-up spool by said film attains a predetermined amount.

43. The microfilm apparatus of claim 36 wherein said additional means includes:

fourth gear means rotatably mounted on said housing and driven about a third axis by said power means through a friction drive means;

fifth gear means rotatably mounted to said housing and drivingly connected to said fourth gear means for rotation thereby; and sixth gear means connected to said take-up spool and adapted to engage said fifth gear means when said cartridge is inserted in said apparatus.

44. The microfilm apparatus of claim 43 wherein said friction drive means includes:

first pulley means operably connected to said motor means for rotation thereby;

second pulley mean connected to said fourth gear means and rotatable therewith; and a friction drive element adapted to slip about said second pulley when the tension force applied to said take-up spool by said film attains a predetermined amount.

* * * * *